US012810136B2

(12) United States Patent
Tseng et al.

(10) Patent No.: US 12,810,136 B2
(45) Date of Patent: Nov. 24, 2026

(54) SIGNAL DETECTION METHOD AND ELECTRONIC DEVICE FOR ABNORMAL SIGNAL DETECTION

(71) Applicant: ASUSTeK COMPUTER INC., Taipei (TW)

(72) Inventors: Yuan-I Tseng, Taipei (TW); Po-Yin Lai, Taipei (TW); Shu-Chiao Liao, Taipei (TW)

(73) Assignee: ASUSTEK COMPUTER INC., Taipei City (TW)

(*) Notice: Subject to any disclaimer, the term of this patent is extended or adjusted under 35 U.S.C. 154(b) by 1000 days.

(21) Appl. No.: 17/337,645

(22) Filed: Jun. 3, 2021

(65) Prior Publication Data

US 2021/0390404 A1 Dec. 16, 2021

(30) Foreign Application Priority Data

Jun. 11, 2020 (TW) ................................ 109119751

(51) Int. Cl.
*G06N 3/08* (2023.01)
*G06N 3/04* (2023.01)

(52) U.S. Cl.
CPC ................ *G06N 3/08* (2013.01); *G06N 3/04* (2013.01)

(58) Field of Classification Search
CPC ........... G06N 3/08; G06N 3/04; G06N 3/042; G06N 3/043; G06N 3/044; G06N 3/0442; G06N 3/045; G06N 3/0455; G06N 3/0463; G06N 3/047; G06N 3/0475; G06N 3/048; G06N 3/049; G06N 3/0495; G06N 3/0499
See application file for complete search history.

(56) References Cited

U.S. PATENT DOCUMENTS

2019/0287230 A1* 9/2019 Lu .......................... G06N 3/088
2020/0372339 A1* 11/2020 Che ..................... H03M 7/3059
(Continued)

FOREIGN PATENT DOCUMENTS

| | | | |
|---|---|---|---|
| CN | 108287782 | A | 7/2018 |
| CN | 109672639 | A | 4/2019 |
| CN | 109948796 | A | 6/2019 |

(Continued)

OTHER PUBLICATIONS

Predicting breast cancer metastasis by using serum biomarkers and clinicopathological data with machine learning technologies, Yi-Ju Tseng, Chuan-En Huanga, Chiao-Ni Wen, Po-Yin Laib, Min-Hsien Wue, Yu-Chen Sunb, Hsin-Yao Wang, Jang-Jih Lu, International Journal of Medical Informatics 128 (Year: 2019).*
(Continued)

*Primary Examiner* — Van C Mang
(74) *Attorney, Agent, or Firm* — McClure, Qualey & Rodack, LLP

(57) ABSTRACT

The disclosure provides a signal detection method. The signal detection method includes: collecting initial data; pre-processing the initial data to obtain an original signal; reconstructing the original signal by using an optimized deep learning model, to generate a reconstructed signal; and comparing the original signal with the reconstructed signal, to determine whether there is an abnormality in the original signal. The disclosure further provides an electronic device using the signal detection method.

13 Claims, 5 Drawing Sheets

(56) References Cited

U.S. PATENT DOCUMENTS

| | | | | |
|---|---|---|---|---|
| 2021/0256991 | A1* | 8/2021 | Jun | G10L 25/30 |
| 2021/0358115 | A1* | 11/2021 | Hever | G06T 7/0008 |

FOREIGN PATENT DOCUMENTS

| | | | |
|---|---|---|---|
| CN | 110858288 | A | 3/2020 |
| CN | 110995681 | A | 4/2020 |

OTHER PUBLICATIONS

Jambukia et al., "Classification of ECG signals using machine learning techniques: A survey", 2015, 2015 International Conference on Advances in Computer Engineering and Applications, vol. 2015, pp. 714-721 (Year: 2015).*

Yufeng, "The 7 Steps of Machine Learning", 2017, Medium, retrieved from https://medium.com/towards-data-science/the-7-steps-of-machine-learning-2877d7e5548e on Feb. 14, 2025 (Year: 2017).*

Zimmerer et al., "Context-encoding Variational Autoencoder for Unsupervised Anomaly Detection", 2018, arXIv, v1, pp. 1-13 (Year: 2018).*

Mahmud et al., "Unsupervised classification of high-dimension and low-sample data with variational autoencoder based dimensionality reduction", 2019, 2019 IEEE 4th International Conference on Advanced Robotics and Mechatronics (ICARM), vol. 4 ( 2019), pp. 1-6 (Year: 2019).*

Asperti, "Variance Loss in Variational Autoencoders", May 22, 2020, arXiv, v2, pp. 1-12 (Year: 2020).*

Sun et al., "Application of Deep Belief Networks for Precision Mechanism Quality Inspection", 2014, IFIP Advances in Information and Communication Technology, vol. 435, pp. 87-93 (Year: 2014).*

* cited by examiner

SIGNAL DETECTION METHOD AND ELECTRONIC DEVICE FOR ABNORMAL SIGNAL DETECTION

CROSS-REFERENCE TO RELATED APPLICATION

This application claims the priority benefit of Taiwan Application Serial No. 109119751, filed on Jun. 11, 2020. The entirety of the above-mentioned patent application is hereby incorporated by reference herein and made a part of specification.

BACKGROUND OF THE DISCLOSURE

Field of the Invention

The disclosure relates to an electronic device performing a signal detection method.

Description of the Related Art

Currently, an abnormal signal marking detection method requires a large quantity of manual operations to mark all the possible feature patterns of an abnormal signal, that is a cumbersome process. There is a plurality of feature patterns corresponding to the abnormal signal, and the feature patterns are not well marked. Consequently, it is difficult to mark all the feature patterns of the abnormal signal, resulting in affecting accuracy of abnormality detection.

BRIEF SUMMARY OF THE INVENTION

According to the first aspect of the disclosure, a signal detection method is provided. The signal detection method includes: collecting initial data; pre-processing the initial data to obtain an original signal; reconstructing the original signal by an optimized deep learning model, to generate a reconstructed signal; and comparing the original signal with the reconstructed signal, to determine whether there is an abnormality in the original signal.

According to the first aspect of the disclosure, an electronic device is provided. The electronic device includes a sensor and a computing device. The sensor is configured to collect a plurality of pieces of sample data and initial data. The computing device is electrically connected to the sensor, where the computing device pre-processes the plurality of pieces of sample data to obtain a plurality of sample signals and trains a deep learning model by the sample signals, to generate an optimized deep learning model; and the computing device pre-processes the initial data to obtain an original signal when the optimized deep learning model is established and reconstructs the original signal by the optimized deep learning model, and generates a reconstructed signal, and the computing device compares the original signal with the reconstructed signal, to determine whether there is an abnormality in the original signal.

Based on the foregoing, in the disclosure, a signal without noise is reconstructed by using an optimized deep learning model, and abnormality detection is performed by using a feature in which a larger abnormality indicates a larger difference between the reconstructed signal and an original signal, to obtain a clear and explicit detection result.

DETAILED DESCRIPTION OF THE EMBODIMENTS

According to the method of the disclosure, an abnormal signal is removed as a noise, to reconstruct a reconstructed signal without a noise, and a difference between the reconstructed signal and an original signal is compared. Because a larger abnormality indicates a larger difference, abnormality detection is performed by using the feature.

Figure 1:
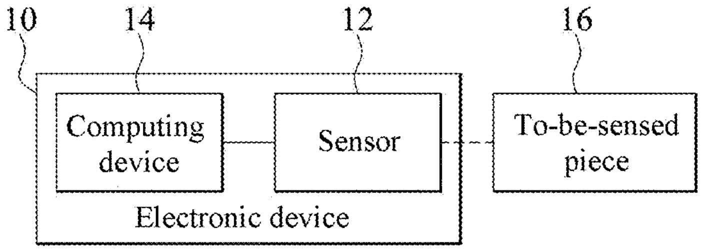
FIG. 1 is a schematic block diagram of an electronic device according to an embodiment of the disclosure.

FIG. 1 is a schematic block diagram of an electronic device according to an embodiment of the disclosure. Referring to FIG. 1, an electronic device 10 includes at least one sensor 12 and a computing device 14. The sensor 12 corresponds to a target element 16 to detect and collect initial data or sample data of the target element 16. The computing device 14 is electrically connected to the sensor 12 to receive the initial data or the sample data, and performs a subsequent operation and application according to the initial data or the sample data. In an embodiment, the sensor 12 and the computing device 14 are independent apparatuses. The sensor 12 is selected according to the target element 16. In an embodiment, the sensor 12 is a microphone for detecting a sound, an accelerometer for detecting an oscillatory wave, or an image capturing apparatus for detecting an image. In an embodiment, the computing device 14 is a notebook computer, a tablet computer, a desktop computer, or the like, which is not limited thereto.

Figure 2:
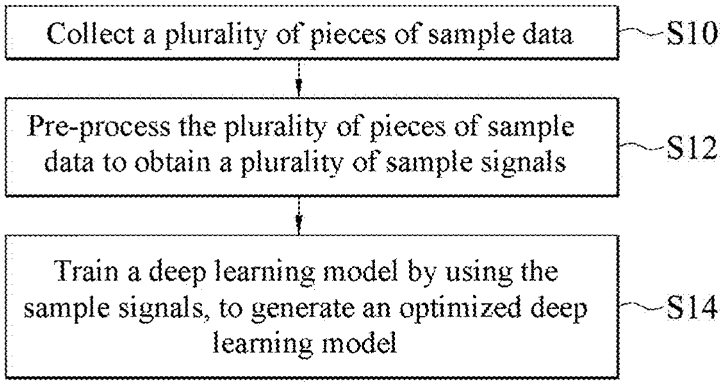
FIG. 2 is a schematic flowchart of establishing an optimized deep learning model according to an embodiment of the disclosure.

Because signal reconstruction is performed by an optimized deep learning model in the disclosure, the optimized deep learning model is established first before a signal detection method is described in detail. Referring to FIG. 1 and FIG. 2, establishment of the optimized deep learning model includes the following steps as described hereinafter. The sensor 12 detects and collects a plurality of pieces of normal sample data of the target element 16 (in step S10), and transmits the plurality of pieces of sample data to the computing device 14. The computing device 14 receives the plurality of pieces of sample data and pre-processes the plurality of pieces of sample data to filter out a noise and obtain a plurality of sample signals (in step S12). The computing device 14 trains a deep learning model by the sample signals, to optimize a model parameter and generate the optimized deep learning model, (in step S14) for providing subsequent feature extraction and signal reconstruction. In a process of training the deep learning model, the computing device 14 performs feature extraction on the sample signal to obtain feature data, reconstructs a training signal without a noise according to the feature data, calculates a difference between the reconstructed training signal and the sample signal, adjusts the model parameter of the deep learning model according to the difference, and repeats the above-mentioned steps for all the sample signals until the difference between the reconstructed training signal and the inputted sample signal converges to a minimum value. When the difference between the reconstructed training signal and the inputted sample signal converges to a minimum value, it indicates that the currently used model parameter has been adjusted to an optimal state, that is, the entire training is completed and an optimized model parameter is thus obtained. The optimized model parameter is used in the deep learning model, and the optimized deep learning model is obtained.

Figure 3:
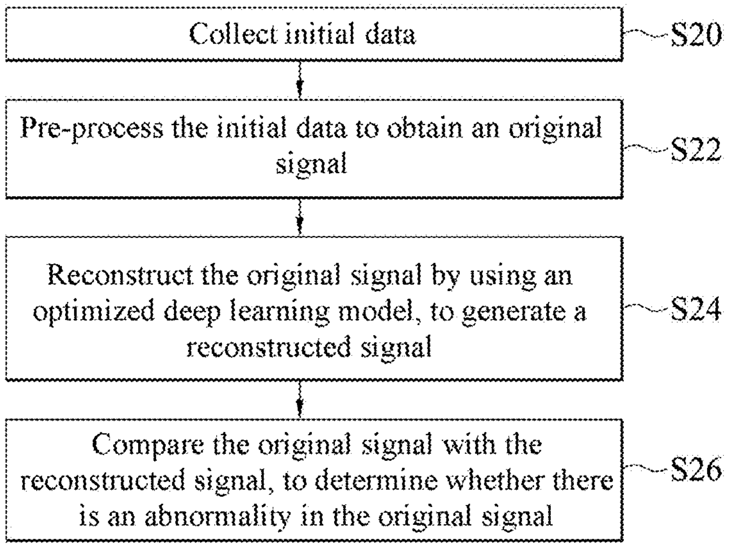
FIG. 3 is a schematic flowchart of a signal detection method according to an embodiment of the disclosure.
Figure 4:
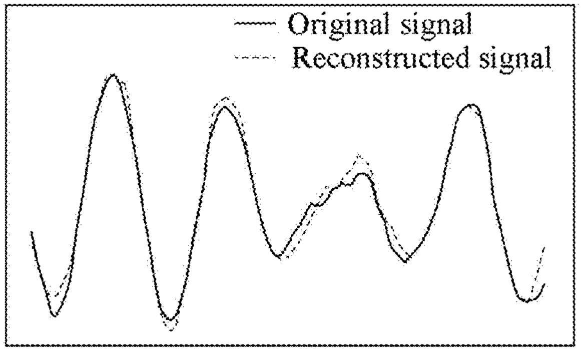
FIG. 4 is a schematic diagram of comparing a normal original signal with a reconstructed signal according to an embodiment of the disclosure.
Figure 5:
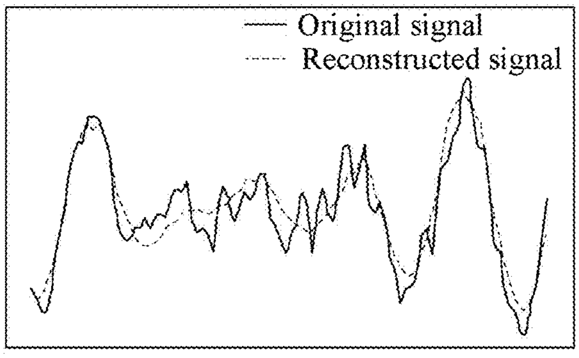
FIG. 5 is a schematic diagram of comparing an abnormal original signal with a reconstructed signal according to an embodiment of the disclosure.

Referring to FIG. 1 to FIG. 3, in the disclosure, the signal detection method includes the following steps: collecting the initial data (in step S20) by the sensor 12, and transmitting the initial data of the target element 16 to the computing device 14. In an embodiment, the initial data and the plurality of pieces of sample data are collected by the same or a similar test condition, to ensure the accuracy of a reconstructed signal. The computing device 14 receives the initial data and pre-processes the initial data to filter out a noise and obtain an original signal (in step S22). The computing device 14 reconstructs the original signal by the optimized deep learning model and generates a reconstructed signal (in step S24). Subsequently, the computing device 14 compares the original signal with the reconstructed signal to determine whether there is an abnormality in the original signal (in step S26). A larger abnormality indicates a larger difference between the reconstructed signal and the original signal. Therefore, the computing device 14 determines whether a difference between the original signal and whether the reconstructed signal is greater than a preset threshold in the step of comparing the original signal with the reconstructed signal. As shown in FIG. 4, in an embodiment, when the difference between the original signal and the reconstructed signal is less than or equal to the preset threshold, it indicates that the original signal is very similar to the reconstructed signal. In this case, the computing device 14 determines that there is no abnormality in the original signal, which means, the original signal is a normal signal. Conversely, as shown in FIG. 5, in an embodiment, when the difference between the original signal and the reconstructed signal is greater than the preset threshold, it indicates that the original signal and the reconstructed signal are obviously different. In this case, the computing device 14 determines that there is an abnormality in the original signal, which means the original signal is an abnormal signal.

In an embodiment, in a step of obtaining the preset threshold, a plurality of original signals is first inputted into the optimized deep learning model. Each original signal generates a corresponding reconstructed signal by the optimized deep learning model, and then the original signals and the corresponding reconstructed signals are classified to determine which pairs of the original signals and the reconstructed signals are good. And the preset threshold is generated by calculating the differences between the good original signals and the good reconstructed signals, and used as a basis to determine whether the original signal is the normal signal or the abnormal signal during subsequent signal detection.

In an embodiment, the sensor 12 is a microphone, the initial data is sound data, and the pre-processed original signal and the reconstructed signal are sound signals. In an embodiment, the sensor 12 is an accelerator, the initial data is oscillatory wave data, and the pre-processed original signal and the reconstructed signal are oscillatory wave signals. In an embodiment, the sensor 12 is an image capturing apparatus, the initial data is image data, and the pre-processed original signal and the reconstructed signal are image signals.

Figure 6:
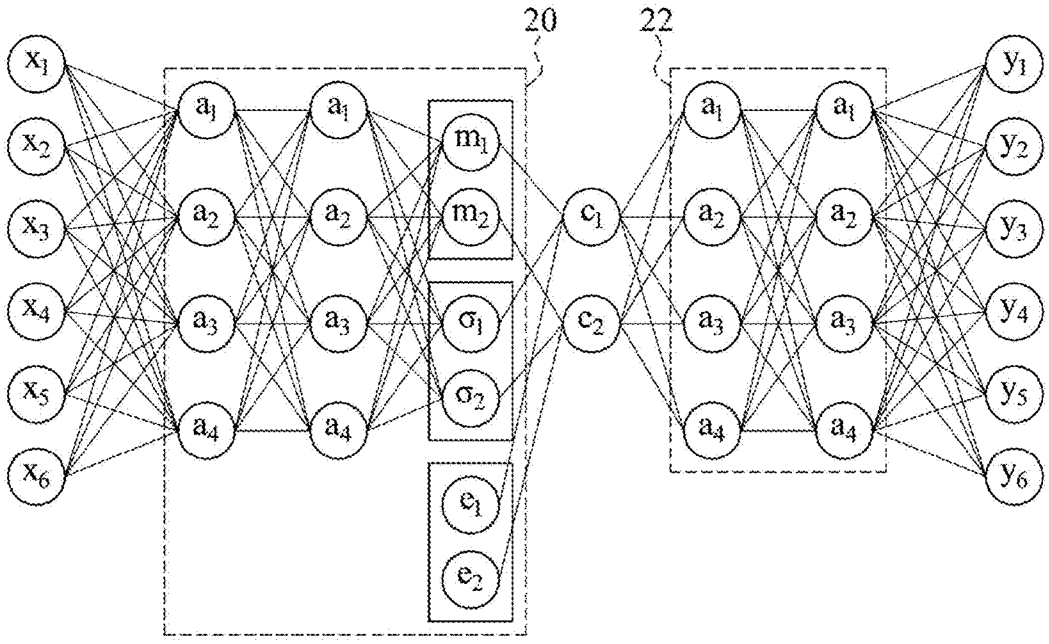
FIG. 6 is a schematic architectural diagram of a variational autoencoder according to an embodiment of the disclosure.
Figure 7:
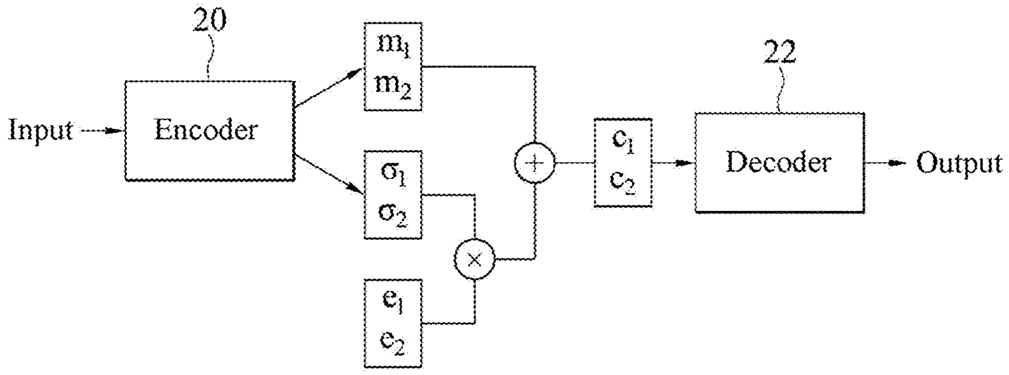
FIG. 7 is a schematic digital diagram of a variational autoencoder according to an embodiment of the disclosure.

In an embodiment, the deep learning model disclosed in the disclosure uses a variational autoencoder algorithm (which is an unsupervised learning model). Referring to FIG. 6 and FIG. 7, an architecture of the variational autoencoder is divided into two parts of an encoder 20 and a decoder 22, to respectively perform compression and decompression. Input values x1 to x6 and output values y1 to y6 represent the same meaning, and some limitations are added in an encoding process, so that the vectors generated by the encoding process follow a gaussian distribution. Because the gaussian distribution is parameterized through a mean and a standard deviation, the signal reconstruction is performed through the variational autoencoder algorithm. In detail, the encoder 20 performs an operation on the input values x1 to x6 of the original signal through computing conditions a1 to a4 of a hidden layer to output two vectors with the means m1 and m2 and the standard deviations σ1 and σ2, generates a third vector with errors e1 and e2 by a normal distribution, performs exponential processing on the standard deviations σ1 and σ2, and adds products to the means m1 and m2 after the standard deviations σ1 and σ2 are multiplied by the errors e1 and e2 to become low-dimensional vectors c1 and c2 in an intermediate layer. Therefore, a general equation of a low-dimensional vector ci is represented as ci=exp (σi)*ei+mi, where σi is the standard deviation, ei is the error, and the mi is the mean. Subsequently, when the low-dimensional vectors c1 and c2 are obtained, computes conditions a1 to a4 of a hidden layer in the decoder 22 and performs operations according to the low-dimensional vectors c1 and c2, then performs the signal reconstruction to obtain the output values y1 to y6 of the corresponding the reconstructed signal.

Figure 8:
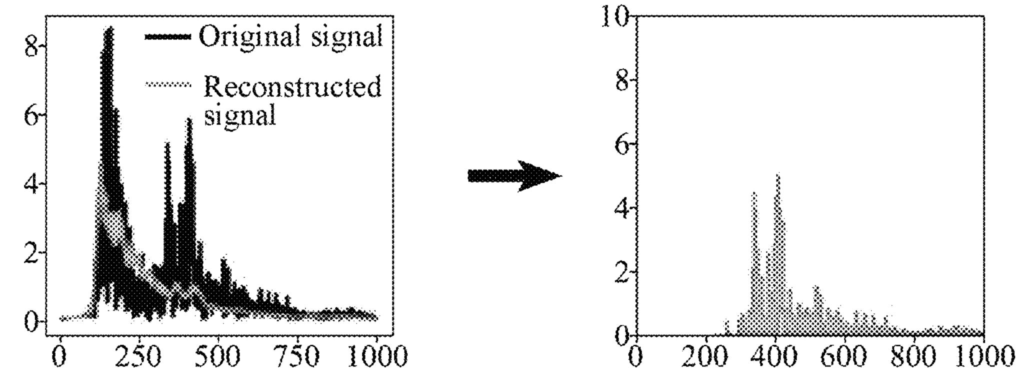
FIG. 8 is a schematic diagram of an embodiment in which an original signal and a reconstructed signal generate an abnormal pattern according to the disclosure.
Figure 9:
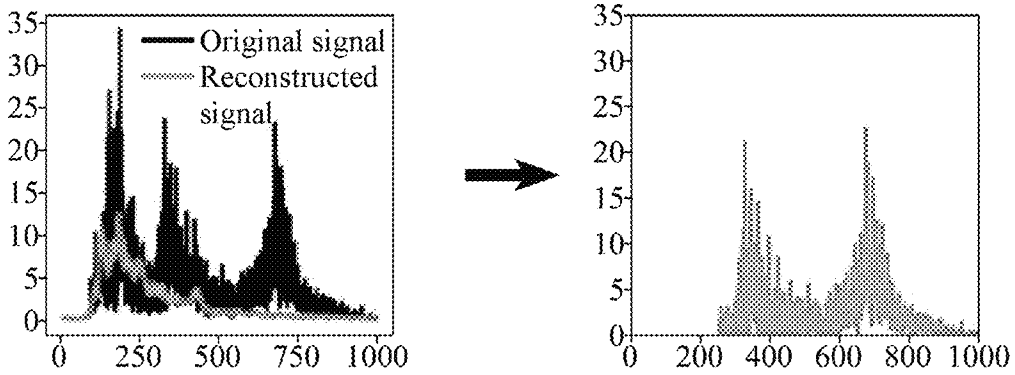
FIG. 9 is a schematic diagram of another embodiment in which an original signal and a reconstructed signal generate an abnormal pattern according to the disclosure.

In the disclosure, in addition to perform abnormality detection on a signal, various applications are conducted in embodiments. In an embodiment, the various applications are pre-processing of data, marking of abnormal data, and increasing a quantity of pieces of data. In terms of the pre-processing data of the deep learning model, input data relates to an obtained result. If a noise of an inputted signal is too large, a result is affected. Therefore, according to the method described in the disclosure, the pre-processing of data is performed to restore the signal or remove the noise, and the reconstructed signal that determined as normal is used as input data of another deep learning model. In terms of the marking of abnormal data, a supervised learning model learns by a marked data set, to improve accuracy of the model. Therefore, an operation is performed by the original signal and the reconstructed signal obtained through the method in the disclosure. As shown in FIG. 8 and FIG. 9, the computing device subtracts the reconstructed signal from the original signal, to obtain an abnormal pattern as showed on the right side in FIG. 8 and FIG. 9. Different abnormal results correspond to different abnormal patterns, and the different abnormal patterns are marked and provided to another supervised learning model as input data. In terms of increasing a quantity of pieces of data, a specific demand is required in the deep learning model since abnormal situations do not happen frequently and the training data is difficult to obtain. Therefore, abnormal patterns corresponding to abnormal data are obtained by subtracting the reconstructed signal from the original signal, and the abnormal patterns are added to originally normal data as the training data, to increase a quantity of pieces of data.

Consequently, in the disclosure, a reconstructed signal without a noise is reconstructed by an optimized deep learning model, and since a larger abnormality indicates a larger difference between the reconstructed signal and an original signal, a clear and explicit abnormality detection result is obtained by performing an abnormality detection. Furthermore, the abnormality detection result is widely applied to the pre-processing of data, the abnormal marking of data, and increasing the quantity of pieces of data.

The embodiments described above are only used for explaining the technical ideas and characteristics of the disclosure to enable a person skilled in the art to understand and implement the content of the disclosure, and are not intended to limit the patent scope of the disclosure. That is, any equivalent change or modification made according to the spirit disclosed in the disclosure shall still fall within the patent scope of the disclosure.

What is claimed is:

1. A signal detection method, comprising:

collecting initial data of a target element by a sensor;

pre-processing the initial data by filtering a noise from the initial data to obtain an original signal of the target element by a computing device;

reconstructing the original signal by executing a variational autoencoder algorithm using an optimized deep learning model to generate a reconstructed signal, wherein the variational autoencoder algorithm comprises an encoder portion for performing data compression and a decoder portion for performing data decompression, wherein the encoder portion performs an operation on the input values of the original signal through computing conditions of a hidden layer to output two vectors with mean and standard deviations, generates a third vector with errors by a normal distribution, performs exponential processing on the standard deviations, and adds products to the means after the standard deviations are multiplied by the errors to become low-dimensional vectors in an intermediate layer, a general equation of the low-dimensional vector $c_i$ is represented as ci-exp (σi)*$e_i$+$m_i$, where $\sigma_i$ is the standard deviation, ei is the error, and the $m_i$ is the mean, and when the low-dimensional vectors are obtained, computing conditions of a hidden layer in the decoder portion performs operations according to the low-dimensional vectors to perform the signal reconstruction to obtain output values as the reconstructed signal; and comparing the original signal with the reconstructed signal to determine whether there is an abnormality in the original signal of the target element.

2. The signal detection method according to claim 1, wherein the abnormality in the original signal is determined when a difference between the original signal and the reconstructed signal is greater than a preset threshold.

3. The signal detection method according to claim 1, wherein the original signal is a sound signal, an image signal, or an oscillatory wave signal.

4. The signal detection method according to claim 1, wherein an establishment of the optimized deep learning model further comprises:

collecting a plurality of pieces of sample data;

pre-processing the plurality of pieces of sample data to obtain a plurality of sample signals; and training a deep learning model by the sample signals, to generate the optimized deep learning model.

5. The signal detection method according to claim 4, wherein the initial data and the plurality of pieces of sample data are collected by a same test condition.

6. The signal detection method according to claim 4, wherein the step of training the deep learning model by the sample signals further comprises:

performing feature extraction on each sample signal to obtain feature data;

reconstructing a training signal according to the feature data;

calculating a difference between the training signal and each sample signal, to adjust a model parameter of the deep learning model according to the difference;

obtaining an optimized model parameter when the difference between the training signal and each sample signal converges to a minimum value; and using the optimized model parameter in the deep learning model, to generate the optimized deep learning model.

7. The signal detection method according to claim 1, further comprising: subtracting the reconstructed signal from the original signal to obtain an abnormal pattern.

8. An electronic device, comprising:

a sensor, configured to collect a plurality of pieces of sample data and initial data of a target element; and a computing device, electrically connected to the sensor, wherein the computing device configures to pre-process the plurality of pieces of sample data by filtering a noise from the plurality of pieces of sample data to obtain a plurality of sample signals and trains a deep learning model by the sample signals to generate an optimized deep learning model, pre-process the initial data to obtain an original signal of the target element when the optimized deep learning model is established and reconstructs the original signal by executing a variational autoencoder algorithm using the optimized deep learning model to generate a reconstructed signal, wherein the variational autoencoder algorithm comprises an encoder portion for performing data compression and a decoder portion for performing data decompression, and compare the original signal with the reconstructed signal to determine whether there is an abnormality in the original signal of the target element;

wherein the encoder portion performs an operation on the input values of the original signal through computing conditions of a hidden layer to output two vectors with mean and standard deviations, generates a third vector with errors by a normal distribution, performs exponential processing on the standard deviations, and adds products to the means after the standard deviations are multiplied by the errors to become low-dimensional vectors in an intermediate layer, a general equation of the low-dimensional vector ci is represented as $c_i$-exp ($\sigma_i$)*$e_i$+$m_i$, where $\sigma_i$ is the standard deviation, ei is the error, and the mi is the mean, and when the low-dimensional vectors are obtained, computing conditions of a hidden layer in the decoder portion performs operations according to the low-dimensional vectors to perform the signal reconstruction to obtain output values as the reconstructed signal.

9. The electronic device according to claim 8, wherein the original signal is a sound signal, an image signal, or an oscillatory wave signal.

10. The electronic device according to claim 8, wherein the computing device further configures to perform feature extraction on each sample signal to obtain feature data, reconstruct a training signal according to the feature data, calculate a difference between the training signal and each sample signal to adjust a model parameter of the deep learning model according to the difference, obtain an optimized model parameter when the difference between the training signal and each sample signal converges to a minimum value and generate the optimized deep learning model based on the optimized model parameter in the deep learning model.

11. The electronic device according to claim 8, wherein the initial data and the plurality of pieces of sample data are collected by a same test condition.

12. The electronic device according to claim 8, wherein the computing device further subtracts the reconstructed signal from the original signal to obtain an abnormal pattern.

13. The electronic device according to claim 12, wherein the computing device further marks the abnormal pattern, and provides the marked abnormal pattern to a supervised learning model as input data.

* * * * *